United States Patent

Haworth et al.

[11] Patent Number: 6,068,017
[45] Date of Patent: May 30, 2000

[54] DUAL-FUEL VALVE

[75] Inventors: Edward Haworth, Walworth; Dawei Chen, Brookfield; Gerald C. Ruehlow, Oconomowoc, all of Wis.

[73] Assignee: Generac Power Systems, Inc., Waukesha, Wis.

[21] Appl. No.: 09/167,181

[22] Filed: Oct. 6, 1998

[51] Int. Cl.[7] .............................. F02B 43/10; F02B 43/12
[52] U.S. Cl. ..................... 137/271; 137/886; 123/527; 123/575
[58] Field of Search ..................... 137/270, 271, 137/866, 886; 251/216, 218, 264, 274; 123/527, 575

[56] References Cited

U.S. PATENT DOCUMENTS

| | | |
|---|---|---|
| 737,632 | 9/1903 | Jennings . |
| 914,209 | 3/1909 | Watson . |
| 1,015,164 | 1/1912 | Fowden . |
| 1,104,918 | 7/1914 | Mouat . |
| 1,366,591 | 1/1921 | Passano . |
| 2,010,201 | 8/1935 | Ruttiman ................................. 251/141 |
| 3,853,144 | 12/1974 | Whelan ................................... 137/608 |
| 4,520,766 | 6/1985 | Akeroyd .............................. 123/27 GE |
| 4,574,763 | 3/1986 | Hallberg .................................... 123/527 |
| 4,589,397 | 5/1986 | Stankewitsch ...................... 123/527 X |
| 4,815,693 | 3/1989 | James et al. ............................... 251/14 |
| 5,329,906 | 7/1994 | Jensen et al. ........................... 123/470 |
| 5,676,117 | 10/1997 | Williams .................................. 123/527 |
| 5,775,309 | 7/1998 | Burrahm ................................. 123/575 |

*Primary Examiner*—John Rivell
*Attorney, Agent, or Firm*—Jansson, Shupe, Bridge & Munger, Ltd.

[57] ABSTRACT

A valve for flowing gaseous fuel, i.e., natural gas or propane gas, to an internal combustion engine includes a valve body having an inlet passage and first and second outlet paths in parallel with one another and in flow communication with the inlet passage. A plug-type adjustment member is threaded into the body and an annular seat in the body coacts with the adjustment member to form an orifice in the first outlet path. A stop mechanism limits movement of the adjustment member between a first position at which the orifice area is smaller and a second position at which the orifice area is larger. The valve permits adjustment of fuel flow to small engines so that such engines provide maximum power without exceeding applicable emission standards. And the valve is tamper-resistant.

16 Claims, 5 Drawing Sheets

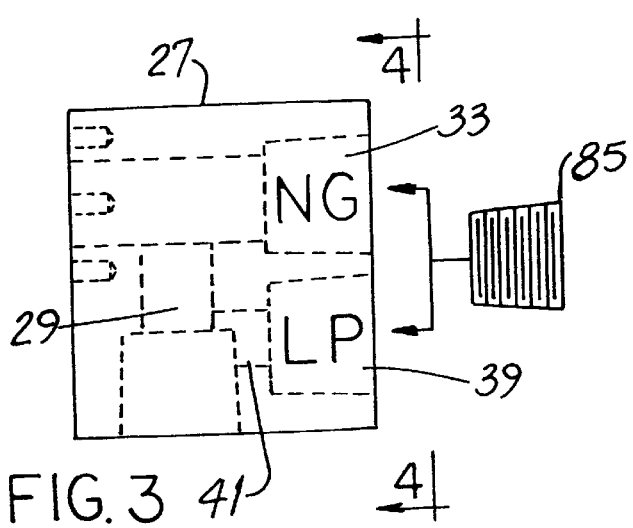
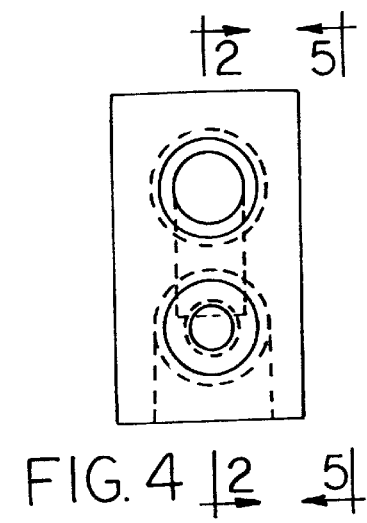
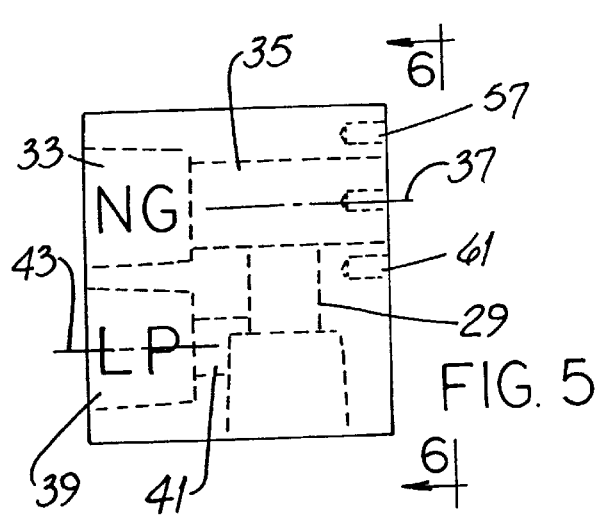
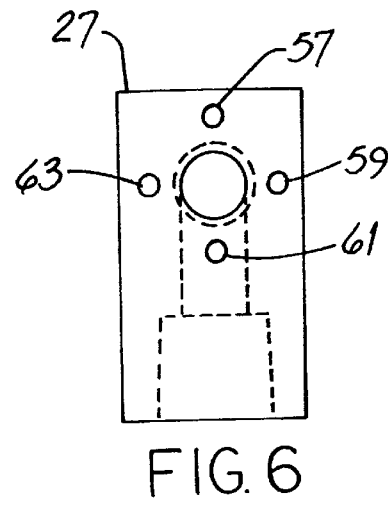
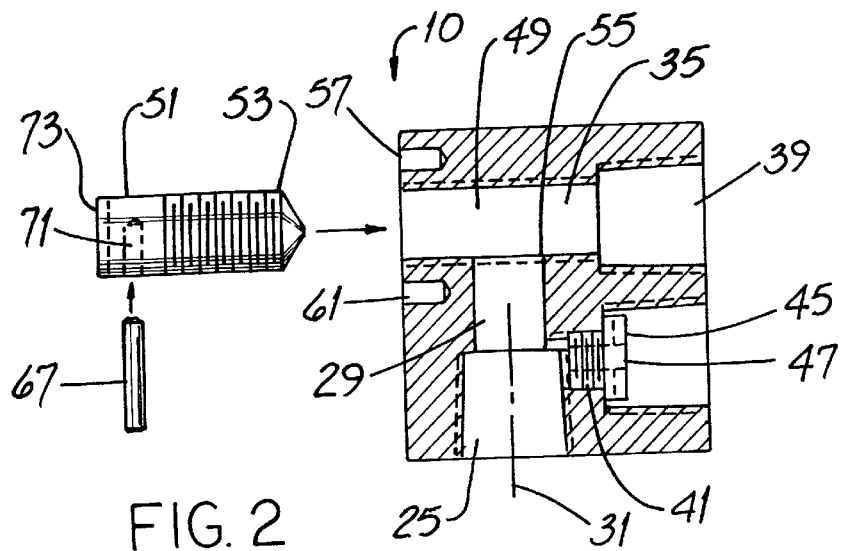

DUAL-FUEL VALVE

FIELD OF THE INVENTION

This invention relates generally to internal combustion engines and, more particularly, to regulating fuel flow to such engines.

BACKGROUND OF THE INVENTION

Smaller internal combustion engines have been popular for decades for powering pumps, grass-cutting equipment, pressure washers, standby generators and the like. Earlier in the history of such engine usage, there was little concern about pollution such as exhaust emissions. But the number of smaller engines in use has increased dramatically and concurrent steps were and are being taken by engine manufacturers and state and federal regulators to help assure that air pollution of engine origin is minimized. A particular emission standard is promulgated by the California Air Resources Board (CARB).

One way to limit pollution while yet obtaining rated or near-rated horsepower out of the engine is to feed fuel to the engine at a particular rate or at a rate which is within a narrow range of rates. When an engine is to be fueled by a single liquid or gas fuel having a known, standard energy content per unit of fuel measure, e.g., British Thermal Units (BTU) per pound, it is a relatively straightforward task to configure a valve to flow fuel from a source to the engine at a particular rate.

But the matter of engine fueling while yet meeting emission standards becomes more complex when an engine is to be fueled with either of two fuels such as natural gas (NG) or liquefied propane gas (LPG). This is so since while LPG has a known, standard energy content per unit of fuel measure, natural gas does not. The energy content of natural gas can and does vary about plus or minus 10% from some norm. Therefore, when fueling a small engine, it is necessary (to meet certain regulatory standards) to be able to adjust the fuel flow rate to obtain high engine horsepower and still stay within the limits established by such standards.

While not particularly relevant to engine fueling, the two-port radiator valve disclosed in U.S. Pat. No. 1,015,164 (Fowden) uses two stops with the valve "off" position about midway between the stops. When the valve indicating finger is against one stop, a reduced-area flow path is established through the valve. And when the valve is turned through "off" to the second stop, a larger-area flow path is established.

U.S. Pat. No. 914,209 (Watson), U.S. Pat. No. 1,104,918 (Mouat), U.S. Pat. No. 2,010,201 (Ruttiman) and U.S. Pat. No. 4,815,693 (James et al.) disclose the idea of using stops to limit the degree to which a valve is opened or closed. For example, the James et al. patent discloses using two pins which stop valve handle travel at the fully open and fully closed positions, respectively.

None of the aforementioned patents relate to engine fueling or recognize the problem addressed and resolved by the invention. Nor do any of the aforementioned patents suggest configuring a valve to be tamper-resistant. This is not surprising—certain of the valves disclosed in such patents are intended for use with steam radiators or in other applications where the ability to adjust the valve over a wide range is important.

OBJECTS OF THE INVENTION

It is an object of the invention to provide a new dual-fuel valve for flowing fuel to an internal combustion engine.

Another object of the invention is to provide a new dual-fuel valve which is suitable for use with natural gas and LPG fuels.

Another object of the invention is to provide a new dual-fuel valve which resists tampering.

Another object of the invention is to provide a new dual-fuel valve which permits adjusting an engine fueling rate within narrow limits to meet certain emission standards.

Still another object of the invention is to provide a new dual-fuel valve which is readily configured to flow either of two fuels therethrough.

Another object of the invention is to provide a new method for making a dual-fuel valve. How these and other objects are accomplished will become apparent from the following descriptions and from the drawings.

SUMMARY OF THE INVENTION

The new dual-fuel valve is used for flowing gaseous fuel to an internal combustion engine. Such valve includes a valve body having an inlet passage and first and second outlet paths in flow communication with the inlet passage. In a specific embodiment, the outlet paths are parallel to one another and intersect the inlet passage. The inlet passage, first outlet path and orifice described below are used when fueling an engine with natural gas.

A seat is formed or otherwise provided in the valve body. That is, the seat may be machined into the body or be provided as a feature of a jet or orifice device threaded into the body.

A plug-type manually-movable adjustment member is mounted with respect to the body, preferably by threading such member into a hole in the body for axial movement toward and away from the seat. The seat coacts with the adjustment member to define a flow orifice in the first outlet path.

A highly preferred embodiment of the valve includes structure which prevents the adjustment member from being moved to a position at which the relevant emission standard would be exceeded. To that end, a stop mechanism is mounted with respect to the body and limits movement of the adjustment member between a first position at which the orifice area is a smaller or first area (which is greater than zero, i.e., the orifice is not closed) and a second position at which the orifice area is a second, larger area. The orifice area becomes progressively larger as the adjustment member moves from the first position toward the second position. To prevent later inadvertent movement of the adjustment member, such member is adhesively secured in the body, preferably at a gas-flow position intermediate the first and second positions.

The stop mechanism includes a pin-like stop fixed with respect to the adjustment member and, preferably, pressed into and permanently retained in a hole in such member. The stop protrudes laterally from the adjustment member and in a specific embodiment, is at a right angle to such member.

The stop mechanism takes either of two preferred configurations, depending upon the particular engine with which the valve is used or is to be used and depending upon which embodiment of the invention is used. In one configuration, used with larger engines in the exemplary range of 16 HP to 18 HP (480 cc to 570 cc displacement), the stop mechanism also includes a single abutment, e.g., a pin or the like, fixed with respect to the body and, preferably, pressed into and permanently retained in a hole in such body. The abutment is parallel to and spaced from the adjustment member so that as such member is rotated in either direction, the stop strikes the abutment. With larger engines, only a single abutment is needed since the adjustment member can be rotated nearly one full turn without resulting in engine emission beyond the standard.

But with smaller engines in the exemplary range of 13 HP to 15 HP (360 cc to 410 cc), and considering a specific embodiment of the valve, it is preferred that rotation of the adjustment member be limited to significantly less that one full turn. In this valve configuration, the valve includes a second abutment fixed with respect to the body and spaced from the first abutment. As set forth in the detailed description, the abutments are set to permit about 145–150° rotation of the adjustment member.

And for an exemplary engine of 7.8 HP (220 cc), the range of rotation of such member is about 55–60°. As will now be appreciated by those of ordinary skill in the art, rotation of the adjustment member moves the nose of such member toward or away from the seat and changes the effective area of the orifice formed by such member and seat.

One of the outlet paths is closed, irrespective of the fuel being used. When the valve is used with natural gas fuel, the second outlet path (used when LPG is the fuel) is blocked by a closure. And when LPG is the fuel, the first outlet path is so blocked.

It is preferred that the inlet passage and the outlet paths be of generous area so that fuel flow regulation can be more precisely obtained using discrete orifices. As noted above, LPG fuel has a known, standard energy content per unit of fuel measure. Therefore, the orifice in the aperture device placed in the second outlet path can have a fixed area predetermined by computation and, perhaps, by modest experimentation.

In another, more highly preferred embodiment, there is a jet device fixed in the first outlet path by, e.g., threading the device into the body. A chamfered seat is formed on such device and for a specific range of engine displacement, the same jet device is used, irrespective of engine displacement.

In this embodiment, the adjustment member has a tapered nose portion and adjustment members having differing nose portions, i.e., nose portions of differing taper, e.g., 45° and 60°, are available. The valve assembler selects an adjustment member from among plural adjustment members having differing respective nose portions. Such selection is made in view of the displacement of the engine. In a more specific embodiment, an adjustment member having a nose portion tapered at 45° is used with engines of 220 cubic centimeters (cc) displacement. An adjustment member having a nose portion tapered at 60° is used with engines of 360, 410, 480 and 570 cc displacement.

This embodiment is more preferred for a specific situation involving a group of engines having displacements described above since for the entire group, an appropriate adjustment range is available over slightly less than one full turn of the adjustment member. As a consequence, only a single pin-type stop need be used.

Another aspect of the invention involves a new method for making a valve for flowing gaseous fuel to an internal combustion engine. Such method includes providing a valve body having (a) an inlet passage, (b) an outlet path in flow communication with the inlet passage, and (c) a seat in the outlet path. An adjustment member is threaded into the body to a position abutting the seat.

When the valve is identified for use with a particular engine (or family of engines), the adjustment member is rotated away from the seat through a predetermined number of turns, e.g., one turn or ¾ of a turn. (That is, the use of the plural "turns" contemplates both more than and less than a full turn.) A component is then affixed to the valve to limit (but not prohibit) further rotation of the adjustment member. In a more specific aspect of the method, the component is an abutment and the affixing step includes attaching one abutment or two spaced-apart abutments to the body.

Another more specific aspect of the method includes connecting the valve between a source of natural gas and an engine and running the engine. The adjustment member is then "trimmed" (by rotating it only a few degrees) to provide maximum engine horsepower while yet limiting engine exhaust emission to a maximum predetermined emission level. It has been determined that, often, no trimming whatever is needed.

Further details of the invention are set forth in the detailed description and in the drawings.

BRIEF DESCRIPTIONS OF THE DRAWINGS

FIG. 2 is a view of the valve, partially in section, taken along the viewing plane 2—2 of FIG. 4. Surfaces of parts are shown in dashed outline.

FIG. 3 is a side elevation view, in full representation, of the valve body shown in FIG. 2. Surfaces of parts are shown in dashed outline and a port closure is shown.

FIG. 4 is an end elevation view of the body shown in FIG. 3 taken along the viewing plane 4—4 thereof. Surfaces of parts are shown in dashed outline.

FIG. 5 is another side elevation view of the body shown in FIGS. 2, 3 and 4 taken along the viewing plane 5—5 of FIG. 4. Surfaces of parts are shown in dashed outline.

FIG. 6 is another end elevation view of the body shown in FIG. 5 taken along the viewing plane 6—6 thereof. Surfaces of parts are shown in dashed outline.

DETAILED DESCRIPTIONS OF PREFERRED EMBODIMENTS

Figure 1:
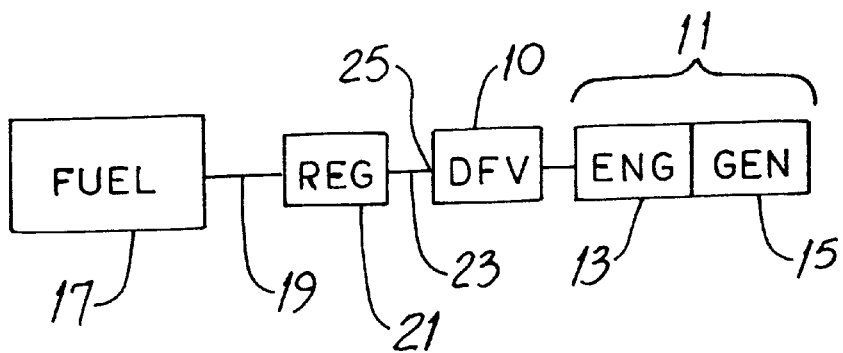
FIG. 1 is a block diagram showing the new dual-fuel valve (DFV) in conjunction with a fuel source, a pressure regulator and an engine driving a standby generator.

Before describing the new dual-fuel valve 10 in detail, it will be helpful to have an understanding of an exemplary way in which such valve 10 is used. Referring to FIGS. 1 and 2, a standby power unit 11 has an internal combustion engine 13 coupled to a portable electrical generator 15. A source of fuel, e.g., a tank 17 containing natural gas or LPG, is mounted near the unit 11 and a fuel line 19 connects the tank 17 to a pressure regulator 21. Another line 23 connects the pressure regulator 21 to the valve inlet port 25.

Referring also to FIGS. 2 through 6, the valve 10 includes a block-like orthogonal body 27 having the inlet port 25 and an inlet passage 29 in series with one another and extending along an inlet axis 31. A first outlet port 33 and first outlet passage 35 are also in series with one another and extend along a first outlet axis 37. The port 33 and passage 35 are used when natural gas is the fuel. The inlet port 25 is used irrespective of whether the fuel is natural gas or LPG and the outlet port 33 and passage 35 are used only when the fuel is natural gas.

Similarly, a second outlet port 39 and outlet passage 41 are also in series with one another and extend along a second outlet axis 43. The port 39 and passage 41 are used when the fuel is LPG. The body 27 is constructed in such a way that both the first and second passages 35, 41 are in flow communication with the inlet passage 29. In a specific embodiment, the axes 37, 43 are parallel to one another and perpendicular to the axis 31.

The valve 10 also includes an aperture device 45 threaded into the passage 41 and having an aperture 47 drilled or otherwise formed in the device 45 to constitute a fixed-area orifice. For a particular engine model, an orifice of fixed area can be used with all such engines fueled by LPG since such fuel has a known, standard energy content per unit measure.

A threaded hole 49 is formed in the body 27 to be coaxial with the first outlet passage 35 and port 33. An elongate, threaded adjustment member 51 is received in the hole 49 and when the adjustment member 51 is threaded into the hole 49 and the shoulder 53 is at or past the edge of the inlet passage 29 (also referred to as seat 55), the passage is entirely occluded. That is, the passage 29 and the first outlet passage 41 are flow isolated from one another. The adjustment member 51 being positioned to entirely occlude the passage 29 is referred to herein as "bottoming" on the seat. (In a specific embodiment, the hole 49 and adjustment member 51 are threaded using M12×1.75 metric thread.)

At least one hole and preferably a plurality of holes 57, 59, 61, 63 is also formed in the body 27 and oriented so that the long axes of such holes 37, 59, 61, 63 are radially spaced equidistant from the axis 37. In a specific embodiment, there are four holes 57, 59, 61, 63 90° apart.

Figure 7:
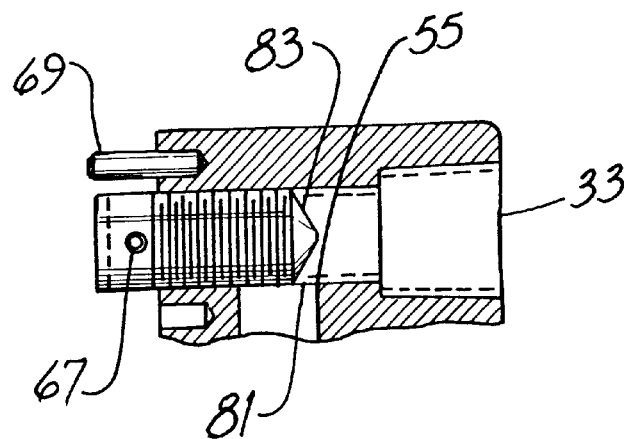
FIG. 7 is a section view of the valve showing the adjustment member at a position wherein the flow orifice is smaller in area. Parts are broken away and other parts are shown in full representation.
Figures 9, 10, 11:
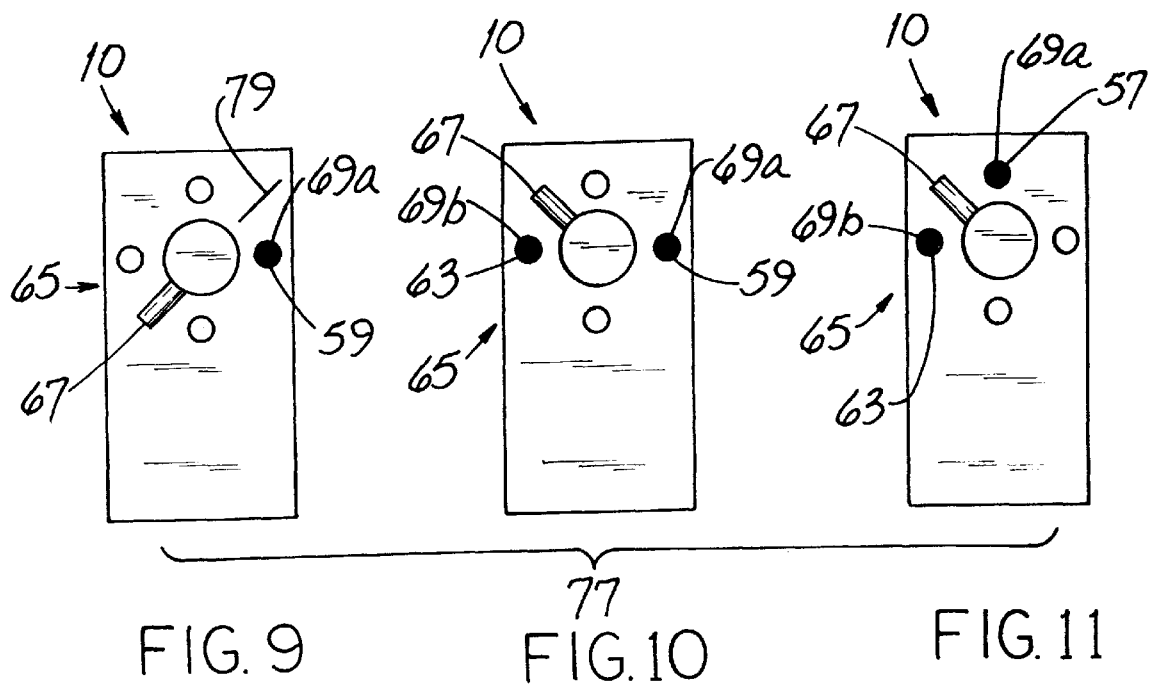
FIG. 9 is an end elevation view, generally like that of FIG. 6, showing the valve configures for use with specific engines in the range of 16–18 HP.
FIG. 10 is another end elevation view, generally like that of FIG. 6, showing the valve configured for use with specific engines in the range of 13–15 HP.
FIG. 11 is yet another end elevation view, generally like that of FIG. 6, showing the valve configured for use with a specific engine of 7.8 HP.

Referring particularly to FIGS. 2, 7 and 11, the valve 10 includes a stop mechanism 65 comprising a stop 67 and one or more abutments 69a, 69b mounted in one or more respective holes 57, 59, 61, 63. Particularly, a pin-like stop 67 is pressed into a hole 71 near the proximal end 73 of the member 51 to extend laterally from such member 51. The stop 67 is secured to the member 51 by a LOKTITE® compound or the like. When the stop 67 is so mounted, it and the axis 37 are nominally at a right angle to one another.

Referring particularly to FIGS. 9–11 a group 77 of valves 10 may be partially assembled for later completion and use with a specific engine 13. Partial assembly involves mounting the stop 67 on the adjustment member 51 and threading the adjustment member 51 into the body 27 until the member 51 bottoms on the seat.

When the specific engine 13 to be used with a partially-assembled valve 10 becomes known, an aperture device 45 with orifice size appropriate for that engine is threaded into the body 27 as shown in FIG. 2. A preferred embodiment of the valve 10 is fitted with the device 45, even though the engine 13 is to be fueled initially with natural gas. In this way, the engine 13 can later be fueled with LPG without changing the valve 10.

Referring now to FIG. 9, it is assumed that a partially-assembled valve 10 is to be used with a known engine 13. When a valve 10 is to be used with an engine 13 in the exemplary 16 HP to 18 HP range, the adjustment member 51 is rotated one full turn away from the seat 55. An abutment 69 is pressed into that hole nearest an axis 79 which is 180° from the stop 67 i.e., hole 59. It has been found that later engine trimming for maximum power may be performed through an adjustment angle of about 315–325° rotation of the adjustment member 51 without exceeding the CARB emission standard.

Referring next to FIG. 10, when a valve 10 is to be used with an engine 13 in the exemplary 13 HP to 15 HP range, the adjustment member 51 is rotated one full turn away from the seat 55. An abutment 69b is pressed into that hole 63 nearest the stop 67 considered in a direction of rotation of the member 51 away from the seat 55. Another abutment 69a is pressed into that hole 59 which is 180° from the hole 63. Engine trimming for maximum power may be performed through an adjustment angle of about 145–150° rotation of the adjustment member 51 without exceeding the emission standard.

And referring now to FIG. 11, when a valve 10 is to be used with an exemplary engine of 7.8 HP, the adjustment member 51 is rotated three-fourths of a turn away from the seat 55. Abutments 69a, 69b are pressed into those two holes 57, 63, respectively, which are nearest the stop 67 and on either side thereof. Engine trimming for maximum power may be performed through an adjustment angle of about 55–60° rotation of the adjustment member 51 without exceeding the emission standard.

Figure 8:
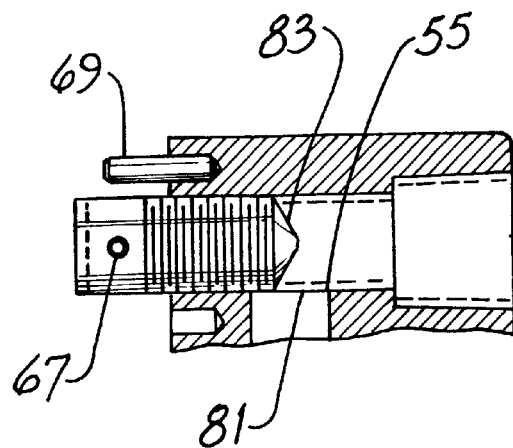
FIG. 8 is a section view of the valve showing the adjustment member at a position wherein the flow orifice is larger in area. Parts are broken away and other parts are shown in full representation.

The manner in which the area of the orifice 81 between the nose 83 and the seat 55 changes with rotation of the adjustment member 51 is illustrated by considering FIGS. 7 and 8. When the adjustment member 51 is closer to the seat 55 as in FIG. 7, the fuel flow area of the orifice 81 is relatively small. And as the adjustment member 51 is moved further away from the seat 55 as in FIG. 8, the area of the orifice 81 increases. As another example, considering the arrangement of FIG. 10, the area of the orifice 81 is smaller when the stop 67 is against the abutment 69a and larger when such stop 67 is against the abutment 69b.

To help assure that the adjustment member 51 is adhesively secured and does not inadvertently move after being set, LOKTITE® ViBra-Seal 516 or the like is applied to a few threads nearest the stop 67. (The particular LOKTITE® compound is not sufficiently aggressive to prevent later field trimming if needed.) And as indicated in FIG. 3, the unused outlet port 33 or 39 is blocked by a closure 85 threaded into such port 33 or 39.

FIGS. 12 through 19 depict an embodiment of the valve 10 which is more highly preferred for a specific group of engines from 220 cc to 570 cc displacement as described in the summary. The valve 10 includes a jet device 89 threaded or otherwise fixed in the first outlet passage 35. A chamfered seat 91 is formed on the jet device 89 and in a very specific embodiment, the device 89 has an opening 93 therethrough which is about 0.6 cm in diameter.

Assuming the valve 10 will be assembled to suit any one of plural engines, there is available (at the assembly floor, for example) adjustment members 51a, 51b having nose portions 95 of differing taper. In specific embodiments, the nose portion 95 of the adjustment member 51a is tapered at 45° and the nose portion 95 of the member 51b is tapered at 60°.

The valve assembler selects an adjustment member 51a or 51b from among plural adjustment members 51a, 51b having differing respective nose portions 95 and, more specifically, nose portions 95 of differing taper. Such selection is made in view of the displacement of the engine 13. The selected adjustment member 51a or 51b is then threaded into the valve body 27. (In a specific embodiment, the adjustment members 51a, 51b are threaded using M12×1.75 metric thread and include a cross notch 82 for receiving an adjusting tool.)

Figure 18:
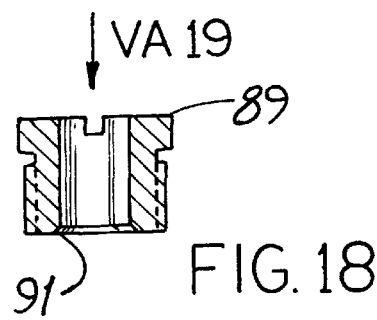
FIG. 18 is a section view of a jet device taken along the viewing plane 18—18 of FIG. 19. Surfaces are shown in dashed outline.
Figure 19:
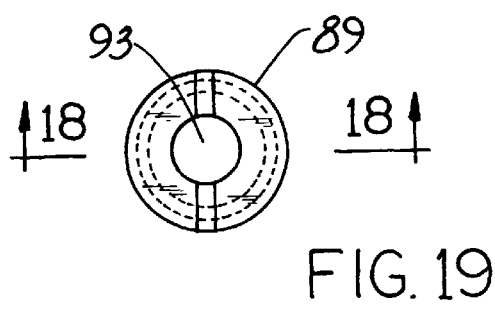
FIG. 19 is a top plan view of the jet device of FIG. 18 but in full representation. The view is along the viewing axis VA19 of FIG. 18 and surfaces of parts are shown in dashed outline.
Figure 12:
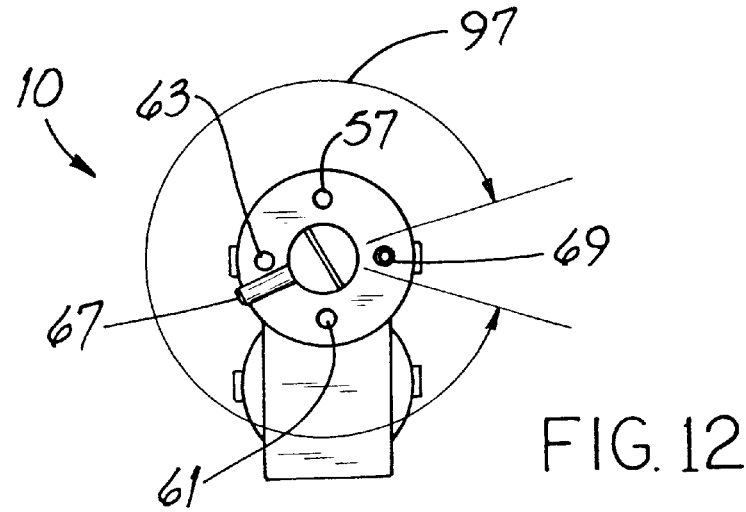
FIG. 12 is an end elevation view of a second embodiment of the new dual fuel valve.
Figure 13:
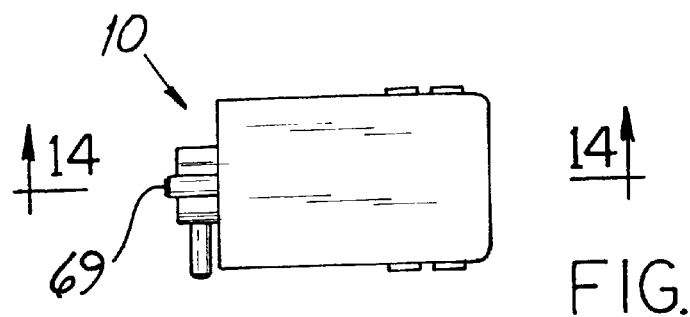
FIG. 13 is a top plan view of the valve of FIG. 12.
Figure 14:
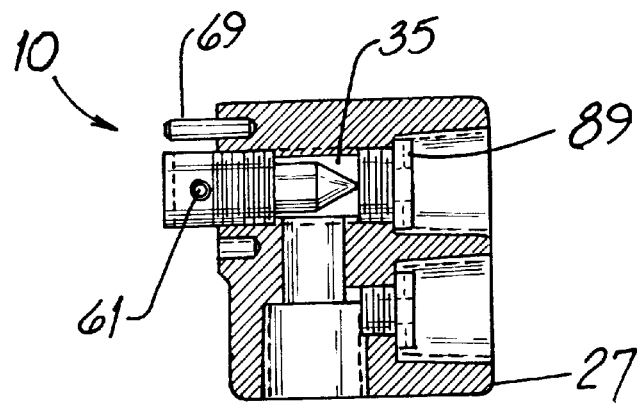
FIG. 14 is a section view of the valve of FIG. 13 taken along the viewing plane 14—14 thereof. Surfaces of parts are shown in dashed outline and other parts are shown in full representation.
Figure 15:
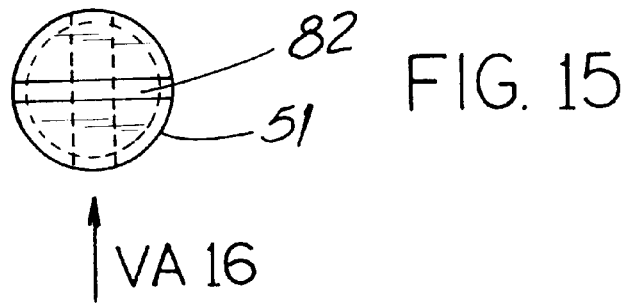
FIG. 15 is a top plan view of the adjustment members of the second embodiment of the valve taken along the viewing axis VA 15 of FIG. 16. Surfaces are shown in dashed outline.
Figure 16:
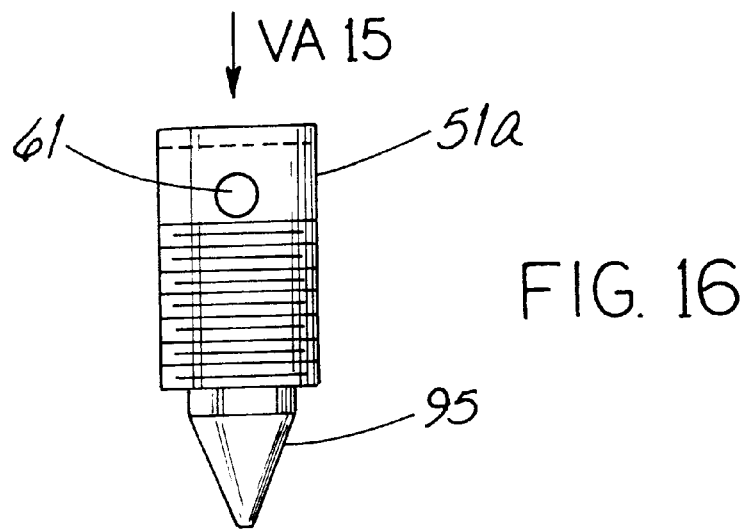
FIG. 16 is a side elevation view of one embodiment of an adjustment member taken along the viewing axis VA16 of FIG. 15. Surfaces are shown in dashed outline.
Figure 17:
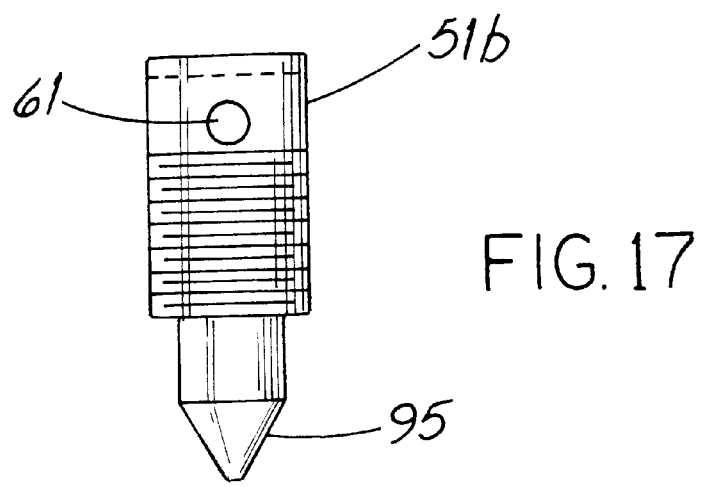
FIG. 17 is a side elevation view of another embodiment of an adjustment member taken along the viewing axis VA16 of FIG. 15. Surfaces are shown in dashed outline.

The seat 91 (with which the nose portion 95 of the adjustment member 51a or 51b coacts to provide fuel flow openings of differing areas) is machined or otherwise formed in the valve body 27 or, more preferably, is formed on the jet device 89 fixed in the body 27 as shown in FIGS. 14, 18 and 19. In the more highly preferred embodiment, the same jet device 89 is used, irrespective of the displacement of the engine 13.

In a specific embodiment, an adjustment member 51a having a nose portion 95 tapered at 45° is used with engines of 220 cubic centimeters (cc) displacement. An adjustment member 51b having a nose portion 95 tapered at 60° is used with engines of 360, 410, 480 and 570 cc displacement.

Most preferably, the selected engine 13 and valve 10 are operated together at the factory and the adjustment member 51a or 51b set at that time. Irrespective of whether field adjustment is later needed (in view of the BTU content of the local natural gas), the stop and the single abutment 69 help assure that CARB standards are not exceeded. An advantage of the embodiment of the valve shown in FIGS. 12–19 is that only a single abutment 69 and a common jet device 89 are used for the group of engines 13 of the displacements described above. Proper natural gas fuel adjustment for any engine 13 in the group can be obtained using either of only two adjustment member 51a, 51b rotatable through an arc of 325–330° or so as represented by the arc arrow 97 in FIG. 12. And for a specific engine 13, the particular adjustment member 51a, 51b is predetermined before the start of engine operation and valve setting.

While the principles of the invention have been shown and described in connection with a few preferred embodiments, it is to be understood clearly that such embodiments are by way of example and are not limiting. For example, it is described above that only a single abutment 69 is needed when the valve 10 is used with larger engines 13 since the adjustment member 51 can be rotated nearly one full turn without resulting in engine emission beyond the standard. But that fact is specific to a valve 10 for a particular family of engines 13 and for an adjustment member and body having a particular thread pitch M12× 1.75. Whether one or two abutments 69 are needed and whether the arc spacing between two abutments is a specific number of degrees are functions of application and of the specific configuration of the valve 10.

And the invention also contemplates an "inside out" version of the valve 10. That is, the valve 10 may be fitted with a stop mechanism 65, a component of which is a stop 67 comprising any one of several arc-shaped "heads" fitted to the adjustment member 51. The arc width of a head is selected to limit rotation of the adjustment member 51 while using one or two abutments 69 placed at location(s) for any valve configuration and any engine.

What is claimed:

1. A valve for flowing gaseous fuel to an internal combustion engine including:
    a valve body having an inlet passage and first and second outlet paths in flow communication with the inlet passage;
    a manually-movable adjustment member mounted with respect to the body;
    a seat in the body and coacting with the adjustment member to form an orifice in the first outlet path, such orifice having an area; and
    a stop mechanism mounted with respect to the body and limiting movement of the adjustment member between a first position wherein the orifice area is a first area and a second position wherein the orifice area is a second, larger area, the stop mechanism includes a stop fixed with respect to the adjustment member and an abutment fixed with respect to the body; and
    wherein the adjustment member is adhesively secured in the body at a gas-flow position intermediate the first and second positions.

2. The valve of claim 1 wherein the adjustment member is threaded into the body for axial movement toward and away from the seat.

3. The valve of claim 2 wherein the first area is greater than zero and the orifice area becomes progressively larger as the adjustment member moves from the first position toward the second position.

4. The valve of claim 1 wherein the abutment is a first abutment and the valve includes a second abutment fixed with respect to the body and spaced from the first abutment.

5. The valve of claim 4 wherein the second outlet path is blocked by a closure.

6. The valve of claim 1 including an aperture device fixed in the body in series with the second outlet path.

7. The valve of claim 6 wherein the first outlet path is blocked by a closure.

8. A method for making a valve for flowing gaseous fuel to an internal combustion engine including:
    providing a valve body having (a) an inlet passage, (b) an outlet path in flow communication with the inlet passage, and (c) a seat in the outlet path;
    threading an adjustment member into the body to a position abutting the seat;
    rotating the adjustment member away from the seat through at least a fraction of a turn; and
    affixing a component to the valve to limit rotation of the adjustment member;
    connecting the valve between a source of natural gas and an engine;

running the engine; and trimming the adjustment member to provide maximum engine horsepower while yet limiting engine exhaust emission to a maximum predetermine emission level.

9. The method of claim 8 wherein the outlet path is a first outlet path and the providing step includes providing a valve body having a second outlet path in flow communication with the inlet passage.

10. The method of claim 9 wherein the component is an abutment and the affixing step includes attaching two spaced-apart abutments to the body.

11. The method of claim 9 further including the step of blocking one of the outlet paths.

12. The method of claim 8 wherein:

the adjustment member includes a tapered nose portion; and wherein the threading step is preceded by the step of:—selecting an adjustment member from among plural adjustment members having differing respective nose portions.

13. The method of claim 12 wherein the selecting step is performed in view of the displacement of the engine.

14. A method for making a valve for flowing gaseous fuel to an internal combustion engine including:

providing a valve body having (a) an inlet passage, (b) a first outlet path in flow communication with the inlet passage, (c) a seat in the outlet path, and (d) a second outlet path in flow communication with the inlet passageway;

threading an adjustment member into the body to a position abutting the seat;

rotating the adjustment member away from the seat through at least a fraction of a turn; and attaching two spaced-apart abutments to the valve body to limit rotation of the adjustment member.

15. A method for making a valve for flowing gaseous fuel to an internal combustion engine including:

providing a valve body having (a) an inlet passage, (b) a first outlet path in flow communication with the inlet passage, (c) a seat in the outlet path; and (d) a second outlet path in flow communication within the inlet passage;

blocking one of the outlet paths by placing an aperture device in the second outlet path;

threading an adjustment member into the body to a position abutting the seat;

rotating the adjustment member away from the seat through at least a fraction of a turn; and affixing a component to the valve to limit rotation of the adjustment member.

16. A method for making a valve for flowing gaseous fuel to an internal combustion engine including:

providing a valve body having (a) an inlet passage, (b) an outlet path in flow communication with the inlet passage, and (c) a seat in the outlet path, the seat being formed on a jet device fixed in the body and the same jet device is used, irrespective of the displacement of the engine;

selecting an adjustment member from among plural adjustment members having differing respective nose portions in view of the displacement of the engine;

threading the selected adjustment member into the body to a position abutting the seat, the selected adjustment member including a tapered nose portion;

rotating the selected adjustment member away from the seat through at least a fraction of a turn; and affixing a component to the valve to limit rotation of the selected adjustment member.

\* \* \* \* \*

UNITED STATES PATENT AND TRADEMARK OFFICE
CERTIFICATE OF CORRECTION

PATENT NO. : 6,068,017
DATED : May 30, 2000
INVENTOR(S) : Edward Haworth et al

It is certified that error appears in the above-identified patent and that said Letters Patent is hereby corrected as shown below:

In column 5, line 65, cancel "37" and insert --57--.

Signed and Sealed this

Twentieth Day of March, 2001

Attest:

NICHOLAS P. GODICI

Attesting Officer      Acting Director of the United States Patent and Trademark Office